United States Patent [19]

Stanford et al.

[11] Patent Number: 5,475,792
[45] Date of Patent: Dec. 12, 1995

[54] TELEPHONY CHANNEL SIMULATOR FOR SPEECH RECOGNITION APPLICATION

[75] Inventors: Vince M. Stanford, Gaithersburg; Norman F. Brickman, Potomac, both of Md.

[73] Assignee: International Business Machines Corporation, Armonk, N.Y.

[21] Appl. No.: 201,157

[22] Filed: Feb. 24, 1994

Related U.S. Application Data

[63] Continuation of Ser. No. 948,031, Sep. 21, 1992, abandoned.

[51] Int. Cl.$^6$ ........................................................ G01L 9/00
[52] U.S. Cl. ........................ 395/2.42; 395/2.63; 395/2.65; 395/2.36
[58] Field of Search ................... 381/29–45; 395/2.1, 395/2.2–2.25, 2.35–2.37, 2.4–2.65; 375/122, 25, 27

[56] References Cited

U.S. PATENT DOCUMENTS

| | | | |
|---|---|---|---|
| 4,069,393 | 1/1978 | Martin et al. | 179/1 SD |
| 4,087,630 | 5/1978 | Browning et al. | 179/1 SD |
| 4,144,582 | 3/1979 | Hyatt | 364/900 |
| 4,461,024 | 7/1984 | Rengger et al. | 381/46 |
| 4,481,593 | 11/1984 | Bahler | 381/43 |
| 4,489,435 | 12/1984 | Moshier | 381/43 |
| 4,718,088 | 1/1988 | Baker et al. | 381/43 |
| 4,720,802 | 1/1988 | Damoulakis et al. | 381/43 |
| 4,783,803 | 11/1988 | Baker et al. | 381/42 |
| 4,805,218 | 2/1989 | Bamberg et al. | 381/43 |
| 4,829,572 | 5/1989 | Kong | 381/41 |
| 4,856,066 | 8/1989 | Lemelson | 381/36 |
| 4,897,878 | 1/1990 | Boll et al. | 381/43 |
| 4,905,286 | 2/1990 | Sedgwick et al. | 381/43 |
| 4,922,538 | 5/1990 | Tchorzewski | 381/42 |
| 4,933,973 | 6/1990 | Porter | 381/43 |
| 4,956,871 | 9/1990 | Swaminathan | 381/31 |
| 5,027,406 | 6/1991 | Roberts et al. | 381/43 |
| 5,036,538 | 7/1991 | Oken et al. | 381/43 |
| 5,068,899 | 11/1991 | Ellis et al. | 381/31 |
| 5,105,463 | 4/1992 | Veldhuis et al. | 381/30 |

FOREIGN PATENT DOCUMENTS

215573  8/1985  European Pat. Off. .

OTHER PUBLICATIONS

Takebayashi et al., "Telephone Speech Recognition Using A Hybrid Method", ICPR (International Conference of Pattern Recognition), Dec. 1989, pp. 1232–1235.

IEEE Article by K. F. Lee & H. W. Hon, "Large Vocabulary Speaker Independent Continuous Speech Recognition Using HMM," 1988, pp. 123–126, (CH2561-9/88/00000-0123).

*Primary Examiner*—Allen R. MacDonald
*Assistant Examiner*—Michelle Doerrler
*Attorney, Agent, or Firm*—John E. Hoel; Martin J. McKinley

[57] ABSTRACT

A telephony channel simulation process is disclosed for training a speech recognizer to respond to speech obtained from telephone systems. An input speech data set is provided to a speech recognition training processor, whose bandwidth is higher than a telephone bandwidth. The process performs a series of alterations to the input speech data set to obtain a modified speech data set. The modified speech data set enables the speech recognition processor to perform speech recognition on voice signals from a telephone system.

7 Claims, 7 Drawing Sheets

TELEPHONY CHANNEL SIMULATOR FOR SPEECH RECOGNITION APPLICATION

This is a continuation of prior application Ser. No. 07/948,031, filed Sep. 21, 1992, now abandoned.

BACKGROUND OF THE INVENTION

This invention relates adapting a speech recognition system to be capable of operating over telephonic public switched networks.

Speech recognition systems are well known to the art. Examples include the IBM Tangora ("A Maximum Likelihood Approach to Continuous Speech Recognition;" L. R. Bahl, F. Jelinek, R. Mercer; Readings in Speech Recognition; Ed.: A. Waibel, K. Lee; Morgan Kaufmann, 1990; pp. 308–319.) and Dragon Systems Dragon 30k dictation systems. Typically, they are single user, and speaker-dependent. This requires each speaker to train the speech recognizer with his or her voice patterns, during a process called "enrollment". The systems then maintain a profile for each speaker, who must identify themselves to the system in future recognition sessions. Typically speakers enroll via a local microphone in a low noise environment, speaking to the single machine on which the recognizer is resident. During the course of enrollment, the speaker will be required to read a lengthy set of transcripts, so that the system can adjust itself to the peculiarities of each particular speaker.

Discrete dictation systems, such as the two mentioned above, require speakers to form each word in a halting and unnatural manner, pausing, between, each, word. This allows the speech recognizer to identify the voice pattern associated each individual word by using preceding, and following, silences to bound the words. The speech recognizer will typically have a single application for which it is trained, operating on the single machine, such as Office Correspondence in the case of the IBM Tangora System.

Multi-user environments with speaker dependent speech recognizers require each speaker to undertake tedious training of the recognizer for it to understand his or her voice patterns. While it has been suggested that the templates which store the voice patterns may be located in a common database wherein the system knows which template to use for a speech recognition by the speaker telephone extension, each speaker must none-the-less train the system before use. A user new to the system calling from an outside telephone line will find this procedure to be unacceptable. Also, the successful telephonic speech recognizer will be capable of rapid context switches to allow speech related to various subject areas to be accurately recognized. For example, a system trained for general Office Correspondence will perform poorly when presented with strings of digits.

The Sphinx system, first described in the Ph.D Dissertation of Kai-Fu Lee ("Large Vocabulary Speaker and Dependent Continuous Speech Recognition: The Sphinx System;" Kai-Fu Lee; Carnegie Mellon University, Department of Electrical and Computer Engineering; April 1988; CMU-CS-88-148), represented a major advance over previous speaker,dependent recognition systems in that it was both speaker independent, and capable of recognizing words from a continuous stream of conversational speech. This system required no individualized speaker enrollment prior to effective use. Some speaker dependent systems require speakers to be reenrolled every four to six weeks, and require users to carry a personalized plug-in cartridge to be understood by the system. Also with continuous speech recognition, no pauses between words are required, thus the Sphinx system represents a much more user friendly approach to the casual user of a speech recognition system. This will be an essential feature of telephonic speech recognition systems, since the users will have no training in how to adjust their speech for the benefit of the recognizer.

A speech recognition system must also offer real time operation with a given modest vocabulary. However, the Sphinx System still had some of the disadvantages of the prior speaker dependent recognizers in that it was programmed to operate on a single machine in a low noise environment using a microphone and a relatively constrained vocabulary. It was not designed for multi-user support, at least with respect to the different locations, and multiple vocabularies for recognition.

This invention overcomes many of the disadvantages of the prior art.

OBJECTS OF THE INVENTION

It is therefore an object of the present invention to provide a continuous speech speaker independent speech recognizer suitable for use with telephony equipment with input from speakers, both local and long distance.

It is another object of the invention to train the system from a vocabulary gathered in low noise conditions to recognize speech patterns in a high noise e.g., telephone environment.

It is another object of the invention to enable a plurality of voice applications to be recognized by a speech recognizer concurrently in a computer network or telephonically.

SUMMARY OF THE INVENTION

These and other objects are accomplished by speech recognition systems, architected on a client/server basis on a local area or wide area network. The speech recognition system is divided into a number of modules including a front end which converts the analog or digital speech data into a set of Cepstrum coefficients and vector quantization values which represent the speech. A back end uses the vector quantization values and recognizes the words according to phoneme models and word pair grammars as well as the context in which the speech made. By dividing the vocabulary into a series of contexts, situations in which certain words are anticipated by the system, a much larger vocabulary can be accommodated with minimum memory. As the user progresses through the speech recognition task, contexts are rapidly switched from a common database (see the Brickman, et al. Patent Application cited herein). The system also includes an interface between a plurality of user applications also in the computer network.

The system includes training modules, training and task build modules to train the system and to build the word pair grammars for the context respectively.

The invention includes a telephony channel simulation process for training a speech recognizer to respond to speech obtained from telephone systems. The method begins by inputting a data set to a speech recognition training processor, whose bandwidth is higher than a telephone bandwidth. Then, the speech data set is decimated to obtain a decimated speech data set having the telephone bandwidth. Then, a bandpass digital filter is applied to the decimated speech data set, which characterizes transmission characteristics of telephone equipment. This is done to obtain a filtered speech data set. Then, the amplitude of the filtered speech data set is rescaled, so that its maximum dynamic range matches the maximum range of uncompanded telephone speech. This is done to obtain a rescaled speech data set. Then, the rescaled speech data set is modified with quantization noise representing a sequence of companding and uncompanding a speech signal in a telephone system. This is done to obtain a modified speech data set. Then, the modified speech data set is input to a speech recognition processor, to train statistical pattern matching data units. The method results in the speech recognition processor being able to perform speech recognition on voice signals from a telephone system.

DESCRIPTION OF THE FIGURES

These and other objects, features and advantages will be more fully appreciated with reference to the accompanied Figures.

DETAILED DESCRIPTION OF THE INVENTION

The bandwidth reductions and noise introduced by telephone lines reduce the accuracy of all speech recognition systems. This effect increases with the size of the vocabulary that must be recognized at each moment in time. The use of rapidly switchable speech recognition contexts useful to this invention, so that individual contexts can be limited in size. Context switching is described in the copending U.S. patent application Ser. No. 07/947,634, filed Sep. 21, 1992, by N. F. Brickman, et al., entitled "Instantaneous Context. Switching For Speech Recognition Systems" assigned to the IBM Corporation and incorporated herein by reference.

Figure 1A:
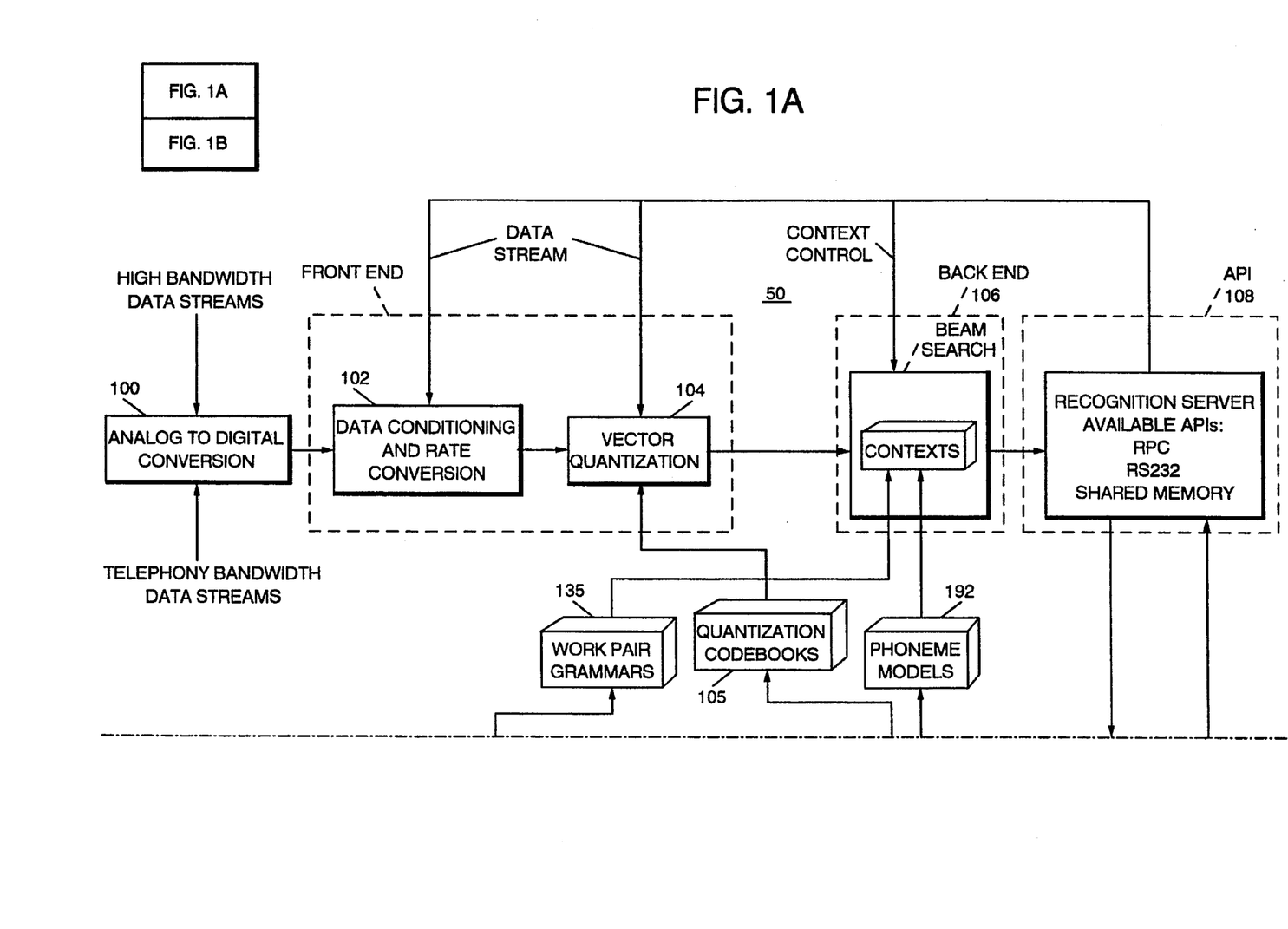
FIG. 1 illustrates the logical architecture of a continuous speech recognition system, which includes the telephony channel simulator invention.
Figure 1B:
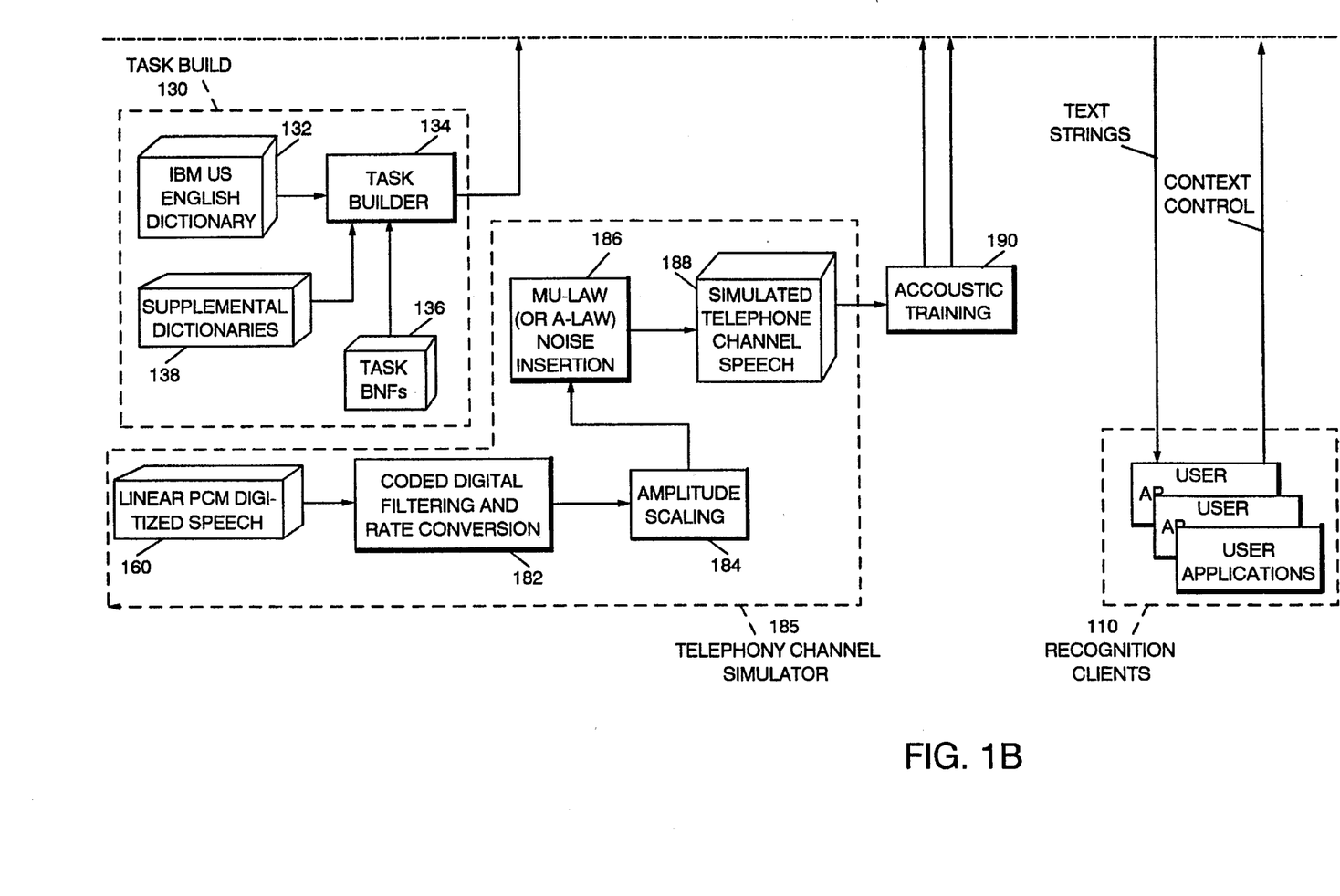

FIG. 1. illustrates the logical architecture of the IBM Continuous Speech Recognition System (ICSRS) independent of hardware configurations. At a broad level, ICSRS consists of components addressing the following areas:

Data Acquisition—Data are converted in block 100 from analog to digital form, or potentially demultiplexed from other channels in the case of telephonic data.

Data Compression—The ICSRS Front End blocks 102 and 104, conditions, resamples, and compresses speech data streams to 300 bytes per second during the vector quantization step.

Speech Recognition—The Back End 106 performs the actual speech recognition by pattern matching phoneme models 192 using a grammar-guided beam search algorithm. The phoneme models 192 and word pair grammars 135 together constitute the recognition contexts. Single or multiple instances of Back-End recognizers can be deployed either remotely or locally to the Front-End instances which acquire and compress the speech data.

Task Building—The task building component 130 allows the construction of recognition contexts off-line, compiles the word pair grammars for use at run time, and binds appropriate phoneme models to the task (context).

Application Program Interface—The API 108 offers RPC based recognition services which allow data stream control, context loading, and activation.

Telephone Channel Simulator—the simulator 185 connects high bandwidth, high resolution speech data sets into phoneme models 192 and telephone speech, having the reduced sampling rate, compressed bandwidth and compressed dynamic range of telephone speech.

During speech recognition, either a high bandwidth voice data stream from a local microphone or a low bandwidth voice data stream, such as would be associated with telephony, is received by the Analog to Digital Conversion block 100. The Analog to Digital Conversion 100 can be performed by a hardware card such as the IBM M-Audio Capture and Playback Card (M-ACPA) card in the voice workstation. It has a digital signal processor which processes either the high bandwidth or telephony bandwidth signals and converts them to a series of digitally sampled data points. This conversion could also be performed by a digital PBX, and the telephony data streams provided in 8 KHz, 8-bit mu-law/a-law compressed format.

For purposes of the present invention, high bandwidth is defined as being a sampling rate of 16 kilohertz or above. Low bandwidth is defined as 8 kilohertz or below which is what the general telephone system in the United States uses for digital voice. The A/D conversion block 100 is optional as in a telephone system the digital information could come in from a private phone exchange (PBX).

The first major block in the "front end" for speech recognition is the Data Conditioning and Rate Conversion (DCRC) block 102. The digitalized input from the A/D conversion 100 is at 44 or 8 kilohertz. A resampling technique referenced to herein as decimation, is used as provided by the public literature in the IEEE (A General Program to Perform Sampling Rate Conversion of Data by Rational Radios;" from "Programs for Digital Signal Processing," Ed.: Digital Signal Processing Committee of the IEEE Acoustics, Speech, and Signal Processing Society; IEEE Press, 1979; Section 8.2, pp. 8.2-1 to 8.2-7 by R. E. Crochiere). The DCRC 102 samples and uses anti-aliasing filters on the digitized signal to create either a 16 kilohertz or 8 kilohertz data stream, for subsequent use. Both the DCRC and Vector Quantization processes are described in greater detail below.

After data conditioning and rate conversion in speech recognition, the voice data is passed to the Vector Quantization block 104. In Vector Quantization, the digital data stream is segmented into Frames of one-fiftieth of a second duration, resulting in 320, 220, and 160 samples each at 16 KHz, 11 KHz, and 8 KHz sampling rates respectively. In one preferred embodiment, there are a hundred frames per second computed from any bandwidth speech signal, they are then over-lapped by fifty-percent, and have a Hamming window applied. The Hamming window is well defined in the public literature ("Theory and Application of Digital Signal Processing," L. R. Rabiner, B. Gold; Prentice Hall, 1975, pp. 91).

After the voice data stream is broken into frames, the vector quantization step extracts features from each frame. In the extraction portion of the Vector quantization step, a series of parameters called the LPC Cepstrum Coefficients are calculated. The Cepstrum Coefficients extract and summarize, some of the important characteristics of the speech for pattern recognition. In each frame of data, a fiftieth of a second of speech is encapsulated. One would expect to have fifty frames per second, however, there is fifty-percent overlap so a hundred frames per second are generated. To calculate the Cepstrum Coefficients, first a Hamming window, which is a cosine bell, is applied to the voice data. A Hamming window tapers the edges each frame of voice data to make the data extracted behave more like .they would in an infinite duration continuous Fourier Transform.

The Hamming windowed frames are pre-filtered using a filter whose z-transform is $1.0-0.97 \ast z^{-1}$, ("Large Vocabulary Speaker and Dependent Continuous Speech Recognition: The Sphinx System;" Fai-Fu Lee; Carnegie mellon University, Department of Electrical and computer engineering; April 1988; CMU-CU-88-148) page 49 in order to flatten the speech spectrum. Then 14 auto-correlation coefficients are computed. The auto-correlation coefficients are used to compute the Cepstrum coefficients in a manner well known in the public literature, described in ("Digital Processing of Speech signals," Prentice Hall Signal Processing Series; 1978, pp. 401–402, 411–413). Thirteen Cepstral coefficients are derived from the 14 auto-correlation coefficients. Other numbers of auto-correlation coefficients and dimensions of numbers of Cepstrum coefficients are possible. The statistical properties of these coefficients are used to guide the final vector quantization step.

Vector quantization is also used in the training process 190. The adjustment of the training data described below are crucial in enabling the base Sphinx recognition engine to operate over telephony equipment, and hence to the invention described herein. In the training process 190, a number of sentences are taken, currently between ten to fifteen thousand, and segmented into frames, from which auto-correlation and Cepstrum coefficients are calculated. A clustering procedure is applied to segregate the Cepstrum frame features into two hundred and fifty six classes using a k-means type clustering procedure, described in ("An Algorithm for Vector Quantizer Design;" Y. Linde, A. Buzo, R. Gray, IEEE Transactions on Communications, Vol. Com-28, No. 1, January 1980). The centers of these Cepstrum clusters, and their class labels, taken together, are hereafter referred to as "code books". The quantization code books 105 stores the code book for telephone speech, generated by acoustic training functions 190. It will store a second code book for high bandwidth speech.

For the final step of vector quantization, block 104 refers to a code book in the quantization code books 105, FIG. 1, derived in the training procedure, just described, to determine which cluster center is closest to the frame Cepstral coefficients. The current frame is then assigned to the class represented by that code book value. Since there are 256 classes, the VQ value is represented by one byte. There are two other one-byte VQ values derived, from the differential Cepstrum, and the power in the frame. There are three one-byte VQ values derived one hundred times per second, resulting in a compression of the speech data stream to 2,400 bits per second.

Part of the telephony invention herein described is that a completely different code book, which characterizes the speech for the recognizer, must be derived for the telephony data and stored in the quantization code books 105 of FIG. 1. Another part of the invention is that a corresponding phoneme model must be derived for the telephony data and stored in phoneme models 192. A telephone appreciably changes the speech signal, because of sampling rate reductions, bandwidth compression, and dynamic range compression. However, rather than using voice samples gathered over the telephone, which involves a significant work effort, high bandwidth samples can be processed to simulate the telephone channel characteristics. This allows using the large, readily available speech data files used in the initial training of the Sphinx System, to enable telephonic speech recognition. The telephone channel simulator is the invention described here.

The telephone channel simulation is accomplished in a three phased process as follows:

1.) Conversion to Telephone Bandwidth

High bandwidth, high resolution speech data set, as provided by references, ("Speech Corpora Produced on CD-ROM Media by The National Institute of Standards and Technology (NIST)," April 1991; "DARPA Resource Management Continuous Speech Database (RMI) Speaker Dependent Training Data," September 1989 NIST Speech Discs 2-1.1, 2-2.1 (2 Discs) NTIS Order No. PB89-226666; "DARPA Resource Management Continuous Speech Database (RMI) Speaker-Independent Training Data," November 1989 NIST Speech Disc 2-3.1 (1 Disc) NTIS Order No. PB90-500539; "DARPA Extended Resource Management Continuous Speech Speaker-Dependent Corpus (RM2)," September 1990 NIST Speech Discs 3-1.2, 3-2.2 NTIS Order No. PB90-501776; "DARPA Acoustic-Phonetic Continuous Speech Corpus (TIMIT)," October 1990 NIST Speech Disc 1-1.1 NTIS Order No. PB91-0505065; "Studio Quality Speaker-Independent Connected-Digit Corpus (TIDIGITS)," NIST Speech Discs 4-1.1, 4-2.1, 4-3.1 NTIS Order No. PB91-505592), (for example 16 bit resolution collected at either 44,100 Hz, or 16,000 Hz) input at block 180 in FIG. 1.

Figure 2:
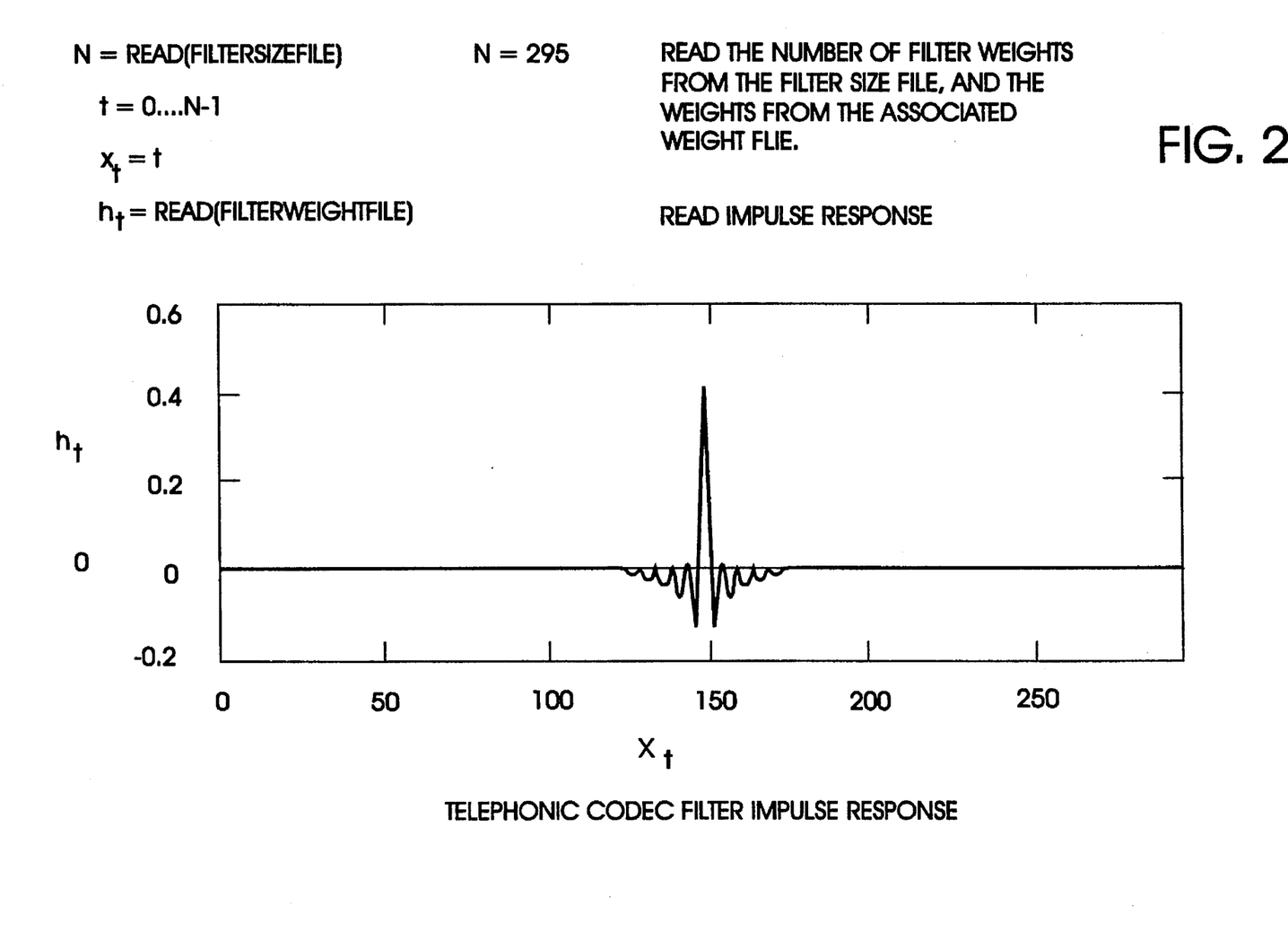
FIG. 2 is a graph which characterizes the telephonic codec filter impulse response.
Figure 3:
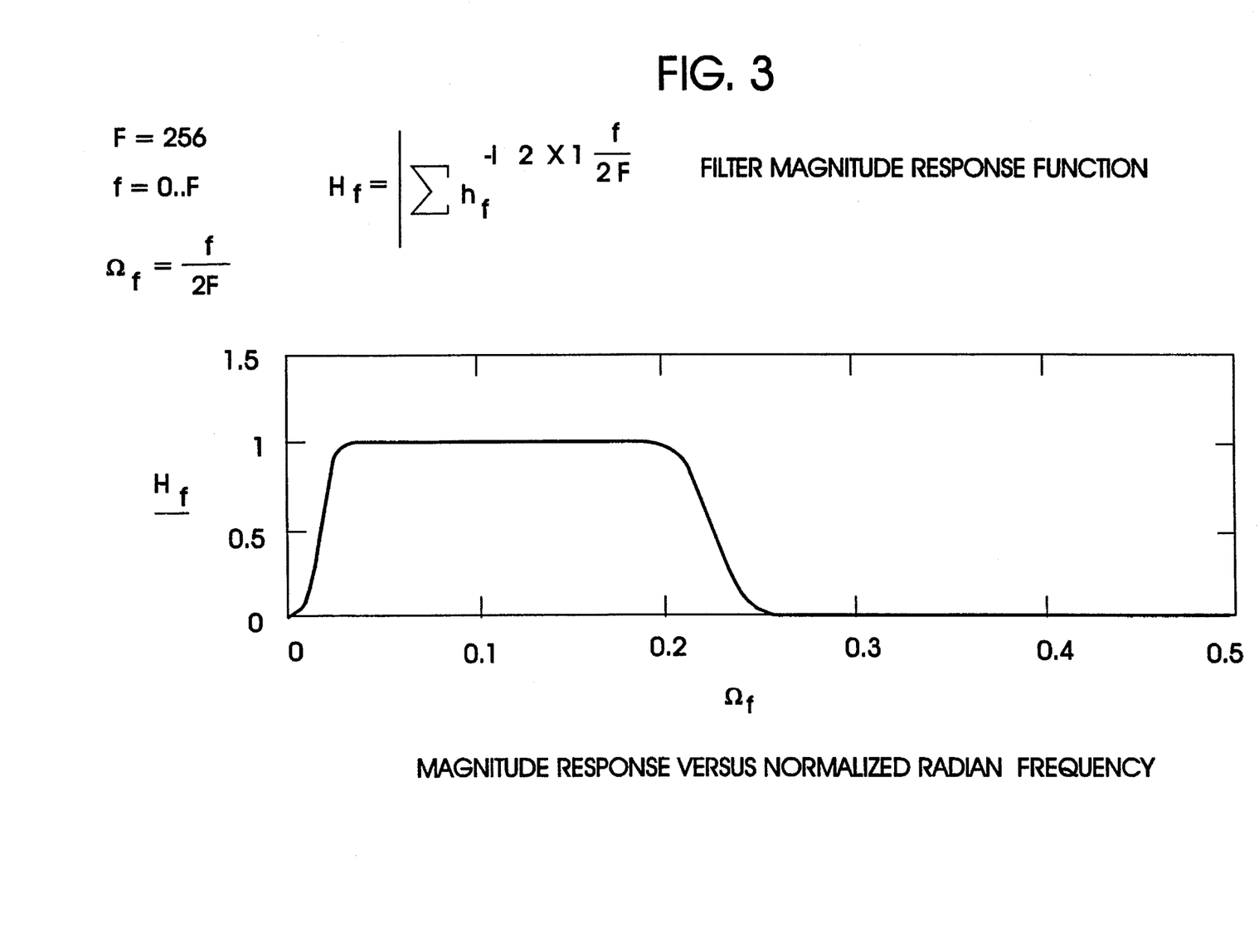
FIG. 3 is a graph illustrating the magnitude response verses normalized radian frequency.
Figure 4:
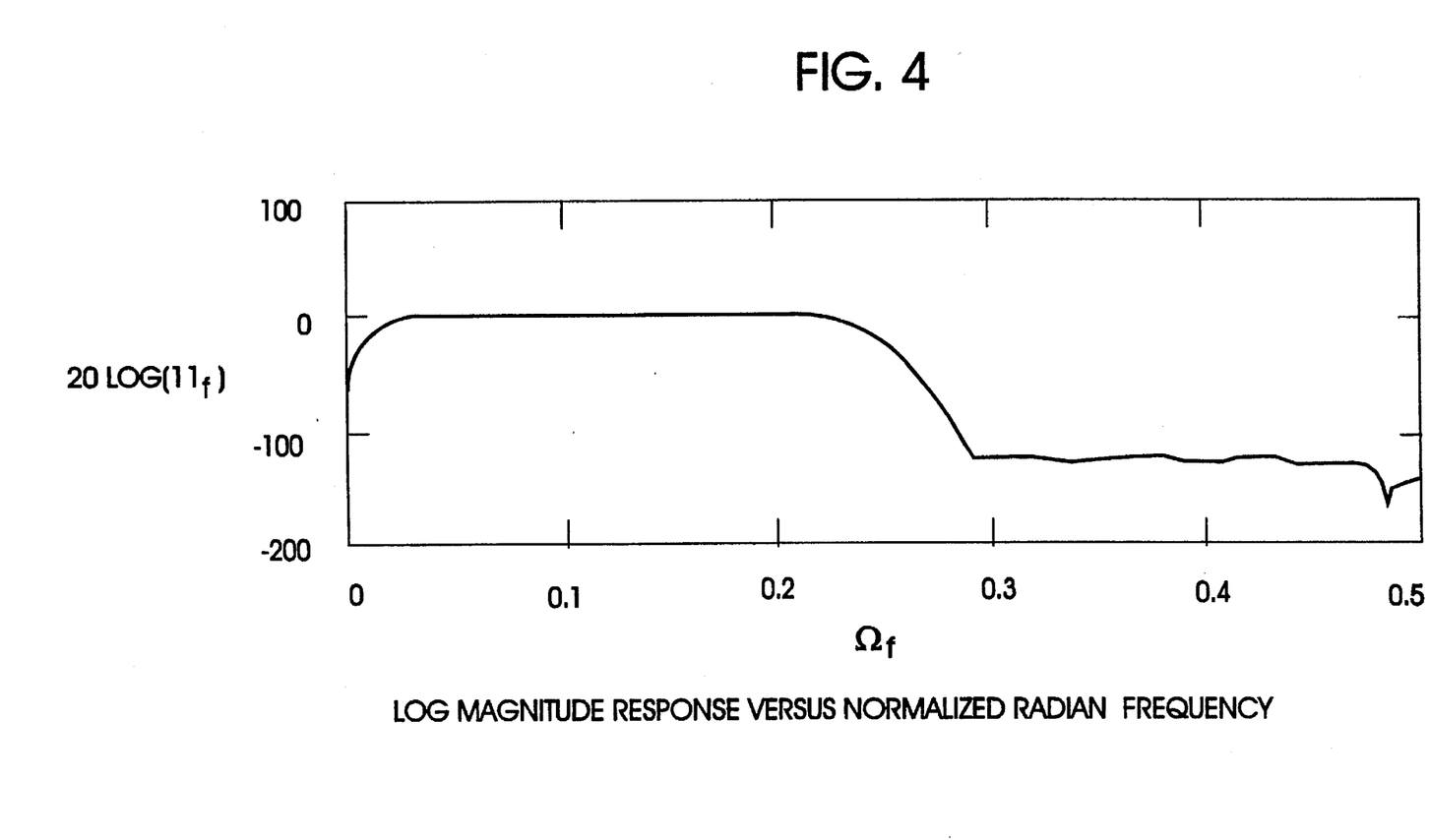
FIG. 4 is a graph which illustrates the log magnitude response verses normalized radian frequency.

The input speech data set 180 is first resampled to 8,000 KHz using the resampling program described in (A General Program to Perform Sampling Rate Conversion of Data by Rational Radios;" from "Programs for Digital Signal Processing," Ed.: Digital Signal Processing Committee of the IEEE Acoustics, Speech, and Signal Processing Society; IEEE Press, 1979; Section 8.2, pp. 8.2-1 to 8.2-7 by R. E. Crochiere) in function block 182 of FIG. 1. This is done after supplying it with a codec band-pass filter designed using a modified version of the MAXFLAT routine described in ("Design Subroutine (MAXFLAT) for Symmetric FIR Low Pass Digital Filters With Maximally-Flat Pass and Stop Bands" from "Programs for Digital Signal Processing," Ed." Digital Signal Processing Committee of the IEEE Acoustics, Speech, and Signal Processing Society; IEEE Press, 1979; Section 5.3, pp. 5.3-1 to 5.3-6 by J. Kaiser) in function block 182 of FIG. 1. This filter is illustrated in FIGS. 2, 3, and 4. The passband characteristic of this filter is designed to closely approximate the coding/decoding, or "codec" filters used in contemporary U.S. telephonic equipment. The placement of the passband, 3 db points and the transition bandwidths are critical to the effectiveness of the invention. It is possible to design a codec filter for recognition training which will provide good recognition on local telephone lines, but not for long-distance lines. To avoid such a problem, these characteristics should be placed at say, 300 Hz for the lower 3 db point, and at 3,600 Hz for the upper 3 db point. The transition bandwidths should be 400 Hz, and 800 Hz respectively. This allows for a passband from 500 Hz, to 3,200 Hz. The passband ripple must be no more than 0.1 percent deviation from unity, throughout the pass band, to approximate the characteristics of actual codec filters.

It is important to note that the Sphinx recognition engine, and other recognition engines such as the Tangora, are sensitive to spectral distortions introduced by linear filters, which do not have flat frequency response in the passband, since the primary speech recognition features are derived from frequency spectra, and their derivatives such as cepstra. Somewhat minor deviations from flat passband response have been shown in our laboratory to result in degradations of several percent in the absolute recognition error rates, for complex recognition tasks. Therefore a maximally flat design algorithm is required. The sensitivity of the Sphinx recognition engine to "spectral tilt" has been noted in ("Acoustical and Environmental Robustness in Automatic Speech Recognition," A. Acero; Carnegie Mellon University, Department of Electrical and Computer Engineering; April 1990; CMU-CS-88-148). Therefore, a MAX-FLAT, or comparably low passband ripple design is required.

The rate conversions required to resample to 8,000 KHz from 44,100 KHz are too demanding for the version of MAXFLAT provided in ("Design Subroutine (MAXFLAT) for Symmetric FIR Low Pass Digital Filters With Maximally-Flat Pass and Stop Bands" from "Programs for Digital Signal Processing," Ed." Digital Signal Processing Committee of the IEEE Acoustics, Speech, and Signal Processing Society; IEEE Press, 1979; Section 5.3, pp. 5.3-1 to 5.3-6 by J. Kaiser) and it provides only for the design of low-pass filters, when a band-pass characteristic is required for the codec type filter required. The design characteristics for this routine are given by two parameters, beta, and gamma, representing the 3 db point and the transition bandwidth in normalized frequency, with the Nyquist frequency mapping to 0.5, and the sampling frequency mapping to 1.0. It is suggested, by Kaiser ("Design Subroutine (MAXFLAT) for Symmetric FIR Low Pass Digital Filters With Maximally-Flat Pass and Stop Bands" from "Programs for Digital Signal Processing," Ed." Digital Signal Processing Committee of the IEEE Acoustics, Speech, and Signal Processing Society; IEEE Press, 1979; Section 5.3, pp. 5.3-1 to 5.3-6 by J. Kaiser), that gamma should be restricted to values "... not much smaller than 0.05." Values lower than this require the routine to be modified to increase the computing precision floating point numbers used, and for the filter coefficient buffers to be expanded from 200, to 4096, since the number of terms in such a filter are roughly proportional to the twice the inverse square of gamma. This accomplished, filters with gamma values as small as 0.005, or about ten times smaller 0.05, which are required for the 44,100 KHz to 8,000 KHz conversion were designed. Two low-pass filter designs, a low-pass to high-pass conversion, and convolutional combination of the high-pass, and low-pass were required to achieve the required band-pass characteristic.

With this filter design accomplished, the 44,100 Hz data was converted to 8,000 Hz in function block 182 of FIG. 1, using the resample algorithm described in (A General Program to Perform Sampling Rate Conversion of Data by Rational Radios;" from "Programs for Digital Signal Processing," Ed.: Digital Signal Processing Committee of the IEEE Acoustics, Speech, and Signal Processing Society; IEEE Press, 1979; Section 8.2, pp. 8.5-1 to 8.2-7 by R. E. Crochiere), providing a codec passband characteristic, which very closely approximates the passband for U.S. long distance telephony equipment. This results in a 16-bit, low-noise signal, which must be treated according to the steps 2.) and 3.) below.

A similar band-pass characteristic, and rate reduction is required for the 16,000 Hz speech samples used in this training technique, with the exception that the transition band requirements are less demanding, and fewer filter weights are required to achieve the passband flatness characteristic desired. FIGS. 2, 3, and 4 again show the Impulse, Magnitude, and Log Magnitude responses of the codec filter as it was implemented for the training one of the pre-training resampling operation.

2.) Scaling to Normalize the Dynamic Range

The speech sample utterances are then read individually, and scaled to a dynamic range of 14-bits, in function block 184 of FIG. 1.

3.) mu-law Companding

Each speech sample is then reduced from 16-bit precision to 8-bit precision using mu-law compression in function block 186 of FIG. 1, as is well known in the public literature, such as ("Digital Telephony and Network Integration;" B. Keiser, E. Strange; Van Nostrand Reinhold Company Inc., 1985, pp. 26–31). The 8-bit compressed data is then expanded, also according to the mu, law formula back to 14-bits.

This results in simulated telephone channel speech data set in block 188 of FIG. 1, which has a quantization noise level which increases, and decreases with the signal strength, and maintains an approximately constant signal-to-noise ratio. This introduces the audible "crackle" noise present in telephony voice signals, particularly when the speaker is loud.

This treatment of speech utterance data 180, which may have been gathered at various bandwidths higher than telephone data, is used to train in block 190 of FIG. 1, a speech recognizer 50 of FIG. 1 for use over telephone equipment. Acoustic training 190 generates phoneme models in block 192 and quantization code books 105 in FIG. 1. This allows practical speech recognition at telephonic bandwidth using the Sphinx speech recognition engine.

RECOGNIZER TRAINING USING SIMULATED TELEPHONE CHANNEL DATA

Dual training sessions are then run so that two code book sets 105 and two phoneme model sets 192 are created, one for telephony, and one for high bandwidth. Each set of code books in 105 and each phoneme model set in 192 is kept separately, and run separately depending on the requirement of the user for high bandwidth, local recognition, or telephony bandwidth. At either bandwidth, the auto-correlation coefficients are extracted to derive Cepstrum coefficients. The Cepstrum coefficients are run through the vector quantizer 104 to classify which is its nearest neighbor for the frame. Thus each speech time-series frame is reduced to three bytes representing the frame, as described in ("Large Vocabulary Speaker and Dependent Continuous Speech Recognition: The Sphinx System;" Kai-Fu Lee; Carnegie Mellon University, Department of Electrical and Computer Engineering; April 1988; CMU-CS-88-148).

The sets of quantized values are sent to the beam search process 106. The beam search 106 is a grammar guided Hidden Markov Model search process called a Viterbi beam search. This grammar guided searchluses a word pair grammar to reduce the search space at any given point.

Another point of the invention is that the recognition system can process both local and long distance calls by placing the cutoff points of the run time data conditioning and rate conversion conversion filter to a bandwidth approximating the narrower of the two bandwidths, so that either type of call will correspond to the bandwidth used in the channel simulator described above. The 3 db point and transition band characteristics should closely approximate those of the upper transition band of the telephony codec filter used in the training and described above.

The beam search (block 106) matches time series derived in the vector quantization, to word sequences from within the word pair grammars, defining each context. The Recognition Server communicates with user applications or Recognition Clients (block 110). The invention's architecture can have multiple front end (workstations) communicating to a single back end or multiple front ends communicating to multiple back ends.

The system is organized and implemented for different levels of operation. For communication networks with a very high data rate, the speech samples could be communicated directly to the system executing the back-end, for front end data compression. A plurality of raw digital speech data streams could be sent to the server containing the back end for multiple users. For a telephony system, multiple channels go to one back end, or multiple users come in to the front end and back end together.

The system is primarily organized around the speech recognition functions deployed as speech recognition servers. The system is guided by any one of a plurality of word pair grammars the application has chosen as the current context. The application has interfaces to the speech recognition system with Application Program Interface (API) calls supporting functions like initializing procedures, status codes and commands ("IBM Continuous Speech Recognition System Programmers Guide," B. Booth, 1992, currently unpublished, available on request). The application will request a certain type of operation or ask the recognition server to load a certain recognition context and to activate the context for recognition when required. The tasks are pre-loaded by the server, usually when the application is first executed. They are then sequentially activated, as required by the activity of the application program.

A set of API calls in the recognition server (block 108) allows user applications (block 110) to request the services of the speech recognition system. user application programs (block 110) can be running on the same computer or a different computer as the various components of the recognition server. If it is on the same computer, the application program (block 110) might interface with the recognition server through shared memory and semaphores, supported by the operating system. If the application program (block 110) and recognition server are on a different computers, communication can be arranged via an RS232 interface, or Remote Procedure Calls (RPC). RPC being well known in the programming literature ("AIX Distributed Environments: NFS, NCS, RPC, DS Migration, LAN Maintenance and Everything," IBM International Technical Support Centers, Publication GG24-3489, May 8, 1990).

Typical examples of user applications may include: Executive Information Systems, Database Access via verbal query, software problem reporting systems, and so forth.

Another example is a telephone answering voice response unit (VRU) which could call on the recognition server to take advantage of the its services. We have implemented versions of these servers on the RISC System 6000(™), and PS/2(™) with OS/2(™).

The Direct Talk 6000(™) is a similar telephony VRU system. In Direct Talk 6000(™) rather than dealing with single telephone lines, the VRU system could require processing of a T1 line (with 24 conversation channels, possibly active simultaneously).

The recognition server architecture can handle multiple clients, as would be required to process such high-volume telephony applications as DirectTalk(™).

The user applications can pre-register many contexts: a restaurants locator, a hard disk help desk, or a software help desk can all pre-register multiple contexts hierarchically. With each application, several users can be inputting speech streams. Each application will tell the recognition server to perform a recognition under a particular context for a particular speech stream, as appropriate for the task being executed.

In other words, multiple users dealing with the same API interface will register all their tasks, with one, or possibly several versions of the recognition server. The system arranges to avoid redundantly loading recognition tasks for multiple users, by checking if the requested task has already been loaded.

The task building (block 130) has several basic sources for its input. One is a U.S. English dictionary (block 132), which is a base dictionary with the pronunciations of twenty thousand words in it. The supplemental dictionary (block 138) is application specific, and allows for the addition of the pronunciation of words not found in the base dictionary. This would typically consist of proper nouns, acronyms, and the like, which a particular application requires for recognition.

The base U.S. dictionary (block 132) supplies words and the phoneme strings drawn on by the Task Builder (block 134). The Task Builder also draws on an appropriate task Baukus-Naur Form (BNF) grammar to determine what can be recognized by the speech server under the task, from the Task BNF library (block 136). For example, in an application which provides information on area restaurants, a first context may be the type of restaurant the caller wants, e.g., French, Italian, Chinese and a second the type was established would be the restaurants in that particular category. The task builder analyzes the BNF to find all the words that are required for the pattern matching and draws out the phoneme representation from the general U.S. dictionary (block 132). Inevitably, every particular application has its own sub-vocabulary which must be added to the system and these are stored in the supplemental dictionaries. For example, in a restaurant help desk, there are generic English words, such as: "Italian", "French", "Spanish", etc., which would be found in the standard U.S. dictionary. However, restaurant names, particularly in foreign languages, e.g., "Cherchez LesFemmes", "Chateau Voulez", but also unusual names for an American restaurant, e.g., J. J. Muldoon's, will not be in any normal dictionary, and must be added to the task supplemental dictionary (block 138). These supplemental dictionaries (block 138) can also contain local vocabulary that is in the base General English (block 132) dictionary which override the pronunciations.

The task builder (block 134) analyzes the input BNF grammar, and generates a grammar which is a list of each word in the grammar and a sub-list of all the words that can follow. Thus each word in the grammar has a list attached to it of legal following words and a pointer to the phoneme representation of each word, (called phoneme models 192 in FIG. 1). The phoneme models 192 are Hidden Markov Models of observing the various VQ values. The hidden Markov models are a group of discrete probability distributions, for the VQ values (as in block 104). These provide the probability of the occurrence of VQ values, given that the hidden Markov state machine is in a particular state within a phoneme. The public literature contains excellent descriptions of Hidden Markov Models in ("A Tutorial on Hidden Markov Models and Selected Applications in Speech Recognition," L. Rabiner; Readings in Speech Recognition; Ed.: A. Waibel, K. Lee; Morgan Kaufmann; 1990; pp. 267–296), as well as elsewhere.

The Beam Search (block 106) uses word models made of concatenated HMM phoneme models 192 from a large table of context sensitive triphones which are generated during the training process. These are used to make an optimal estimate of the word sequence which best explains the observed sequence of VQ values. The beam searcher (block 106) uses the word grammars to select the phoneme models 192 from which to construct the word models used in the search.

The user applications control the recognition server. For example, DirectTalk/2(™), an IBM Program Product described in ("IBM CallPath DirectTalk/2 General Information and Planning Manual;" International Business Machines Publication No. GB35-4403-0; 1991), could be a user application; it is able to answer the phone and perform restaurant locator functions. The restaurant locator application would use the DirectTalk/2(™) system to indicate to the recognition server that it has sixteen contexts and issue a request to pre-load the contexts which are part of the Restaurant Locator help desk. As the application progresses, it requests the context switching of the recognition server. A user calls via the telephone for telephone help. The restaurant locator then requests the recognition server to perform a voice recognition under the first level context. Control and data are exchanged over the API between the recognition server, and the user application. Multiple instances of the DirectTalk/2(™) system could use the same recognition server.

The speech recognition server acquires speech data until a (user adjustable, but most commonly 0.6 seconds) period of silence. Recognition is terminated when this period is observed, and it is assumed that the person is done speaking.

Figure 5:
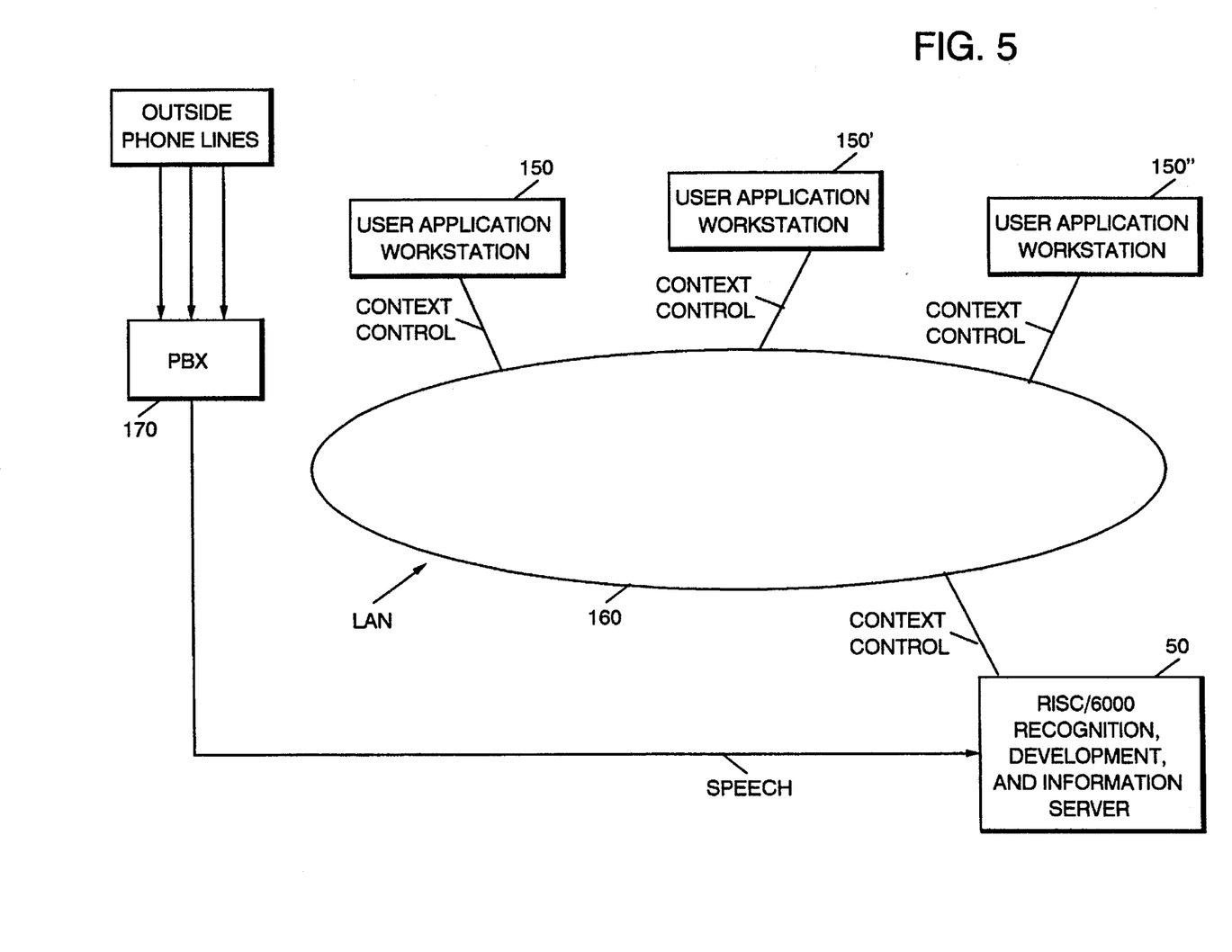
FIG. 5 is a block diagram of a network for a recognition server operating in a telephony customer service call center.

The speech recognition system described herein, is architected to allow multiple deployments, on multiple hardware platforms, and multiple software configurations. For example, one possible architecture is shown in FIG. 5, which provides a physical mapping of the logical architecture 50, discussed above, onto a physical implementation of workstations connected via a local area network 160. Each workstation 150, 150', 150" in this architecture can run multiple independent user applications, and each is master to the recognition server 50 as a slave processor. The PBX 170 is connected to outside telephone lines and delivers a telephony bandwidth data stream to the analog digital conversion 100 of the recognition server 50, also shown in FIG. 1. The text representing recognized speech is returned from the recognition server to the user applications in workstations 150, 150', 150".

TRAINING PROCESS

The training procedure uses a large library of known utterances and their textual transcripts, to estimate the parameters of the phonemes HMMs 192 used in pattern matching of word models to text in the beam search process.

First, the transcripts are used to retrieve the phonemes, representing the pronunciation of the words in the training set, from the General English dictionary.

Next the parameters of phoneme HMMs 192 are estimated in the context of preceding, and following phonemes, (called triphones) to provide for effective estimation of coarticulation effects. The estimation procedure used is the Baum-Welch Forward/backward iteration algorithm described in ("A Tutorial on Hidden Markov Models and Selected Applications in Speech Recognition," L. Rabiner; Readings in Speech Recognition; Ed.: A. Waibel, K. Lee; Morgan Kaufmann; 1990; pp. 267–296). The parameters of the HMMs are iteratively adjusted so as to maximize the probability that the trained triphone HMMs would have generated the time series of VQ values observed in the training set.

There are many parameters for every hidden Markov phoneme model, there being 7 states and 12 transition arcs in each hidden state machine. Associated with each transition arc are associated 256 discrete elements in the probability distribution for each of the three code books. The triphone HMMs parameters that result from the training procedure are clustered sharply to reduce the number of triphones required to adequately represent the coarticulation effects present in continuous speech.

Training is performed with a combination of low bandwidth speech which is gathered via the local telephone exchange and high bandwidth speech from a microphone. The high bandwidth speech is processed by the telephone channel simulator 185 described herein, in accordance with the invention. All three code books are compiled at this stage. The code book versions include Cepstrum, differential Cepstrum, Power and differential Power as described in ("Large Vocabulary Speaker and Dependent Continuous Speech Recognition: The Sphinx System;" Kai-Fu Lee; Carnegie Mellon University, Department of Electrical and Computer Engineering; April 1988; CMU-CS-88-148).

Each of these three code books stored in quantization code books 105 and are used in the run time Vector Quantization process. The effect of the telephone network is simulated here by data pre-conditioning so that the statistical properties of these feature code books will be adjusted in the same manner in which the public telephony network will adjust them. This procedure has resulted in a substantial increases in accuracy in actual telephonic speech recognition with calls originating from a variety of locations in the continental U.S.

Figure 6:
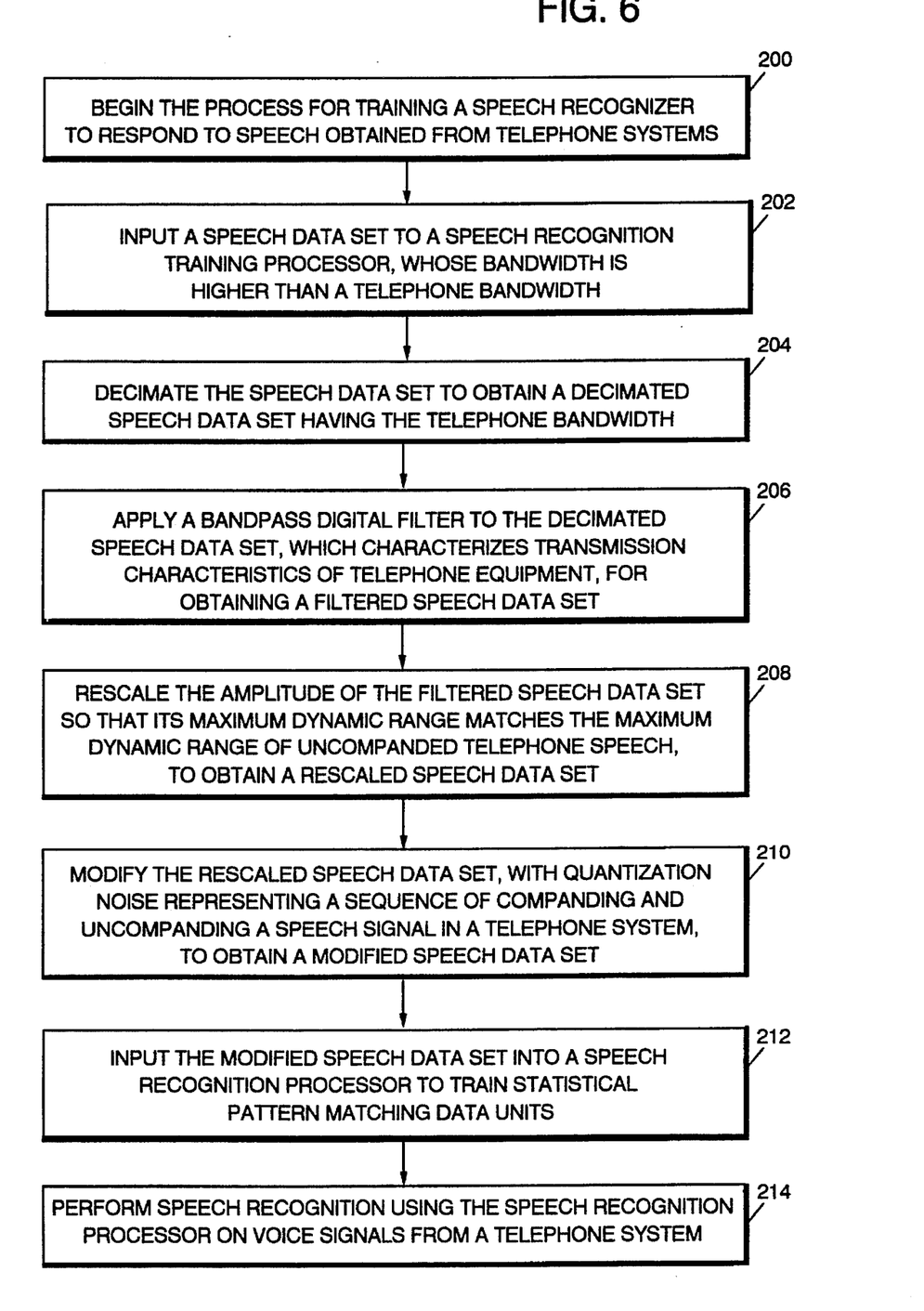
FIG. 6 is a flow diagram of a sequence of operational steps for a process for training a speech recognizer to respond to speech obtained from telephone systems.

Reference can be made to the flow diagram of FIG. 6 which describes the telephony channel simulation process 200 for training a speech recognizer 50 to respond to speech obtained from telephone systems, for example, through a PBX 170. The flow diagram of FIG. 6 represents a computer program method which can be executed on the data processor 50 of FIG. 5.

The process 200 starts with step 202 in which a speech data set is input to a speech recognition training processor 50, whose bandwidth is higher than telephone bandwidth. Example high bandwidth speech data sets are identified in references ("Speech Corpora Produced on CD-ROM Media by The National Institute of Standards and Technology (NIST)," April 1991; "DARPA Resource Management Continuous Speech Database (PMI) Speaker Dependent Training Data," September 1989 NIST Speech Discs 2-1.1, 2-2.1 (2 Discs) NTIS Order No. PB89-226666; "DARPA Resource Management Continuous Speech Database (RMI) Speaker-Independent Training Data," November 1989 NIST Speech Disc 2.3.1 (1 Disc) NTIS Order No. PB90-500539; "DARPA Extended Resource Management continuous Speech Speaker-Dependent Corpus (RM2)," September 1990 NIST Speech Discs 3-1.2, 3-2.2 NTIS Order No. PB90-501776; "DARPA Acoustic-Phonetic Continuous Speech Corpus (TIMIT)," October 1990 NIST Speech Disc 1-1.1 NTIS Order No. PB91-0505065; "Studio Quality Speaker-Independent Connected-Digit Corpus (TIDIGITS)," NIST Speech Discs 4-1.1, 4-2.1, 4-3.1 NTIS Order No. PB91-505592). This corresponds to data input block 180 in FIG 1.

Then, in step 204 in FIG. 6, the speech data set is decimated to obtain a decimated speech data set having the telephone bandwidth. This corresponds to function block 182 of FIG. 1. The decimated speech data set may have bandwidth which is any bandwidth lower than the higher bandwidth of the input speech data set. Decimation process are described in reference (A General Program to Perform Sampling Rate Conversion of Data by Rational Radios;" from "Programs for Digital Signal Processing," Ed.: Digital Signal Processing Committee of the IEEE Acoustics, Speech, and Signals Processing Society; IEEE Press, 1979; Section 8.2, pp. 8.2-1 to 8.2-7 by R. E. Crochiere).

Then, in step 206 in FIG. 6, applies a bandpass digital filter to the decimated speech data set, which characterizes transmission characteristics of telephone equipment. This corresponds to function block 182 of FIG. 1. This is done to obtain a filtered speech data set. The bandpass digital filter should have a maximally flat design algorithm.

Then, in step 208 in FIG. 6, the amplitude of the filtered speech data set is rescaled so that its maximum dynamic range matches the maximum range of uncompanded telephone speech. This corresponds to function block 184 of FIG. 1. This is done to obtain a rescaled speech data set. The rescaling step can result in the maximum dynamic range matching the maximum dynamic range of uncompanded mu-law telephone speech. Alternately, the rescaling step can result in the maximum dynamic range matching the maximum dynamic range of uncompanded A-law telephone speech.

Then, in step 210 in FIG. 6, modifies the rescaled speech data set, with quantization noise representing a sequence of companding and uncompanding a speech signal in a telephone system. This corresponds to function block 186 of FIG. 1. This is done to obtain a modified speech data set. The modifying step can have quantization noise as mu-law noise. Alternately, the modifying step can have quantization noise as A-law noise.

Then, step 212 in FIG. 6, inputs the modified speech data set into the speech recognition processor 50, to train statistical pattern matching data units. This corresponds to output data block 188 of FIG. 1. The simulated telephone channel speech 185 is then used by the acoustic training process 190 to generate phoneme models 192 characteristic of telephone code books 105 characteristic of telephone speech.

Then, in step 214 in FIG. 6, speech recognition can be performed using the speech recognition processor 50, on voice signals from a telephone system, such as, signals from the PBX 170 of FIG. 5.

It should be noted that the conversion of high bandwidth speech using the telephony channel simulator (block 185) is not limited to continuous speech recognizers, but applies to a variety of speech recognition processors, such as, the IBM TangoraDictation System and Dragon Systems, Newton Mass., Dragon 30k Dictate and Kurzweil Applied Intelligence, Voice Report, Waltham, Mass. and others described in ("The Spoken Word," Kai-Fu Lee, et al., Byte Magazine, July 1990, Vol. 15, No. 7; pp. 225–232).

While the invention has been described with reference to a preferred embodiment, it will be understood by those skilled in the art that various changes can be made to the architecture without departing from the spirit and scope of the invention. Accordingly, the invention shall be limited only as specified in the following claims.

We claim:

1. A method for training a speech recognition processor to respond to speech obtained from telephone systems, comprising the steps of:

inputting a speech data set to a speech recognition training processor, said data set having a bandwidth higher than a telephone bandwidth;

decimating said inputted speech data set in said training processor to obtain a decimated speech data set having said telephone bandwidth;

applying a bandpass digital filter to said decimated speech data set in said training processor, said filter characterizing transmission characteristics of telephone equipment, for obtaining a filtered speech data set;

rescaling the amplitude of said filtered speech data set in said training processor, so that the maximum dynamic range of said filtered speech data set matches the maximum dynamic range of uncompanded telephone speech, to obtain a rescaled speech data set;

modifying said rescaled speech data set in said training processor, with quantization noise representing companding and uncompanding a speech signal in a telephone system, to obtain a modified speech data set;

inputting said modified speech data set into a hidden Markov model speech recognition processor to train statistical pattern matching data units;

performing speech recognition on voice signals from a telephone system with said speech recognition processor.

2. The method of claim 1 wherein:

said telephone bandwidth is any bandwidth lower than said higher bandwidth.

3. The method of claim 1 which further comprises:

said bandpass digital filter has a maximally flat design algorithm.

4. The method of claim 1 wherein said rescaling step results in a maximum dynamic range matching a maximum dynamic range of uncompanded mu-law telephone speech.

5. The method of claim 1 wherein said rescaling step results in a maximum dynamic range matching a maximum dynamic range of uncompanded A-law telephone speech.

6. The method of claim 1 wherein said modifying step has quantization noise as mu-law noise.

7. The method of claim 1 wherein said modifying step has quantization noise as A-law noise.

* * * * *